United States Patent [19]

Campbell et al.

[11] Patent Number: 5,441,399
[45] Date of Patent: Aug. 15, 1995

[54] METHOD OF REMOVING STUCK SPRUE AND TOOL FOR REMOVAL THEREIN

[75] Inventors: Norman B. Campbell, Chino; Francisco Garcia, Los Angeles; Stefan Diosan, Norwalk, all of Calif.

[73] Assignee: Wea Manufacturing Inc., Olyphant, Pa.

[21] Appl. No.: 297,260

[22] Filed: Aug. 26, 1994

Related U.S. Application Data

[62] Division of Ser. No. 171,097, Dec. 21, 1993, Pat. No. 5,391,332.

[51] Int. Cl.[6] .............................................. B29C 45/42
[52] U.S. Cl. ...................... 425/556; 425/436 R; 425/436 RM; 425/810; 425/DIG. 51; 264/107
[58] Field of Search ............ 425/436 R, 436 RM, 810, 425/DIG. 51, 556, 554; 264/107, 328.9

[56] References Cited

U.S. PATENT DOCUMENTS

| | | | |
|---|---|---|---|
| 2,471,148 | 5/1949 | Gale et al. | 425/DIG. 51 |
| 2,923,031 | 2/1960 | Collion | 425/DIG. 51 |
| 3,013,303 | 3/1960 | Amazon | 425/436 R |
| 3,208,113 | 9/1965 | Bennett | 22/68 |
| 3,443,001 | 5/1969 | Adair et al. | 264/161 |
| 3,811,175 | 5/1974 | Garner et al. | 29/464 |
| 4,442,619 | 4/1984 | McCarley | 42/1 R |
| 4,466,934 | 8/1984 | Cane et al. | 425/810 |
| 4,585,260 | 8/1986 | Skovajsa | 425/436 R |
| 4,715,806 | 12/1987 | Ehaler et al. | 425/DIG. 51 |
| 4,787,841 | 11/1988 | Simon | 425/556 |
| 4,824,358 | 4/1989 | Takeuki | 425/436 R |

FOREIGN PATENT DOCUMENTS

| | | | |
|---|---|---|---|
| 1112281 | 5/1957 | Germany . | |
| 58-134724 | 8/1983 | Japan | 425/DIG. 51 |
| 58-177326 | 10/1983 | Japan | 425/DIG. 51 |

*Primary Examiner*—Khanh P. Nguyen
*Attorney, Agent, or Firm*—Shenier & O'Connor

[57] ABSTRACT

An improved method of removing a stuck sprue from the ejector assembly of an injection molding machine and a tool for use in the method in which the tool has a body with a hollow lower portion having a bottom edge with peripherally spaced indentations, In the method, the tool is first heated to above the melting point of the molding material and the lower end is inserted into the stuck sprue. The tool is cooled to below the melting point of the molding material and then rocked back and forth to free the sprue from the ejector mechanism.

5 Claims, 3 Drawing Sheets

METHOD OF REMOVING STUCK SPRUE AND TOOL FOR REMOVAL THEREIN

This is a divisional of application, Ser. No. 08/171,097 filed on Dec. 21, 1993, U.S. Pat. No. 5,391,332.

FIELD OF THE INVENTION

The invention is in the field of plastic molding and more particularly relates to a method of removing a stuck sprue in a compact disc molding operation and to a tool for use therein.

BACKGROUND OF THE INVENTION

There is known in the art injection molding apparatus for use in forming compact discs including an upper movable mold member and a lower stationary mold member. When the mold members are moved together, they form a cavity into which the molten material is injected through all opening in the upper dye half. The lower dye half supports a sprue injector including a sleeve and a knockout pin. The sleeve is formed with an internal recess at its upper end into which the plastic material flows when the material is injected into the mold cavity. After the plastic material has been injected into the mold cavity, the assembly is cooled and the sprue injector is retracted to cut the center opening in the disc being molded. This cutout portion of the disc forms part of the sprue which must be ejected. As the ejector assembly is withdrawn, ultimately the knockout pin butts against a stop so that upon continued withdrawal of the ejector assembly, the knockout pin forces the sprue out of the lower mold member. This is the ordinary and desirable sequence of operations in molding a compact disc.

The normal cycle of the apparatus described above is under ten seconds. In the course of each cycle the temperature varies between in excess of 300 degrees Celsius and about 70 degrees Celsius. It sometimes occurs that in the course of what is designed to be the sprue ejection operation, the knockout pin drives through the sprue to eject the center portion thereof while leaving the surrounding portion on the sprue ejector. This probably occurs because the sprue has not yet cooled to a fully solid state. The sprue material remaining after such a malfunction hardens on the ejector and prevents injection of material during the next cycle. Thus, the apparatus shuts down. Before production can be resumed, the stuck sprue material must be removed. In the prior art, this material must be melted out of the tool by use of a torch. It will readily be appreciated that this is a tedious job which interrupts production for an inordinately long period of time.

SUMMARY OF THE INVENTION

One object of our invention is to provide a method for removing a stuck sprue from a molding tool which overcomes the defects of the method of the prior art.

Another object of our invention is to provide a tool for use in our improved method for remvoing a stuck sprue.

A further object of our invention is to provide a method for removing a stuck sprue in a rapid and expeditious manner.

Still another object of our invention is to provide a method for removing a stuck sprue which is simple and expeditious for the result achieved thereby.

A still further object of our invention is to provide a stuck sprue removal tool which is simple construction and inexpensive to manufacture.

Other and further objects of our invention will appear from the following description.

BRIEF DESCRIPTION OF THE DRAWINGS

In the accompanying drawings to which reference is made in the instant specification and which are to be read in conjunction therewith and in which like reference numerals are used to indicate like parts in the various views.

DESCRIPTION OF THE PREFERRED EMBODIMENT

Figure 1:
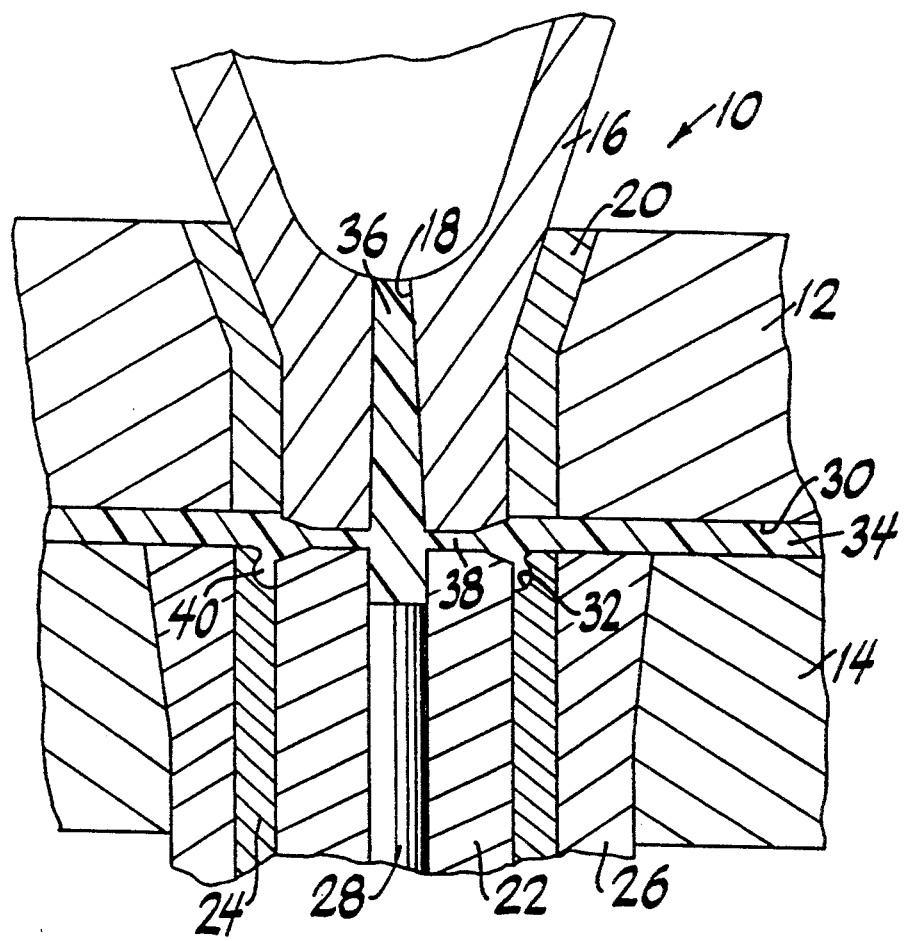
FIG. 1 is a sectional view of a compact disc molding operation in one stage of operation thereof.

Referring now to FIG. 1, a molding apparatus indicated generally by the reference character 10 for use in forming a compact disc or the like includes an upper movable mold half 12 and a lower stationary mold half 14. A plastic injector 16 has an outlet passage 18 for injecting plastic into the mold cavity through an injector bushing 20.

The stationary lower mold half 14 includes a sprue ejector 22 carrying a gate cutter 24 received in a bushing 26 in the stationary lower mold member 14, The ejector 22 has a central bore which slideably receives a knockout pin 28 in a manner known to the art.

In operation of the apparatus 10, the upper and lower mold members 12 and 14 are brought together to form the die cavity 30. Plastic introduced into the cavity 30 through the injector outlet 18 also flows into an internal annular recess 32 in the upper end of the gate cutter 24.

It will be seen that following the operation of injecting plastic into the mold assembly, the compact disc forming material 34 is in the cavity 30 and a sprue includes an elongated center portion 36 extending upwardly into the passage 18 and slightly downwardly into the bore which receives the knockout pin 28, as well as a surrounding sprue part 38 including a boss 40 disposed in the recess 32.

Figure 2:
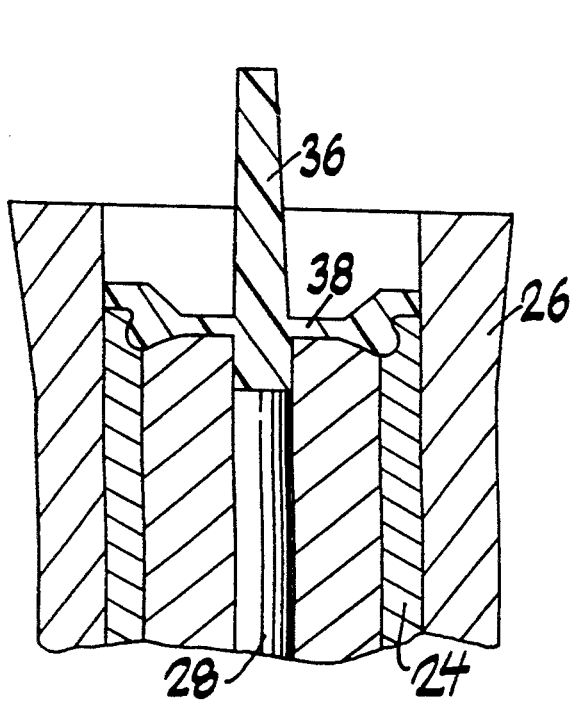
FIG. 2 is a fragmentary sectional view of the apparatus shown in FIG. 1 in a further stage of the molding operation.

In normal operation of the apparatus, after the filling operation, the apparatus is cooled and then the upper section 12 moves away. The ejector 22 and the gate cutter 24 move downwardly relative to the bushing 26, as illustrated in FIG. 2. In the course of this operation the central portion of the disc is pulled downwardly and cut by the sharp inner edge of the bushing 26. This action is illustrated in FIG. 2.

Following the cutting operation shown in FIG. 2, the ejector 22 and the pin 28 move further downwardly until the pin 28 strikes an abutment. As the ejector 22 continues to move downwardly, the pin 28 knocks the sprue out of the bushing 26, as illustrated in FIG. 3.

Figure 3:
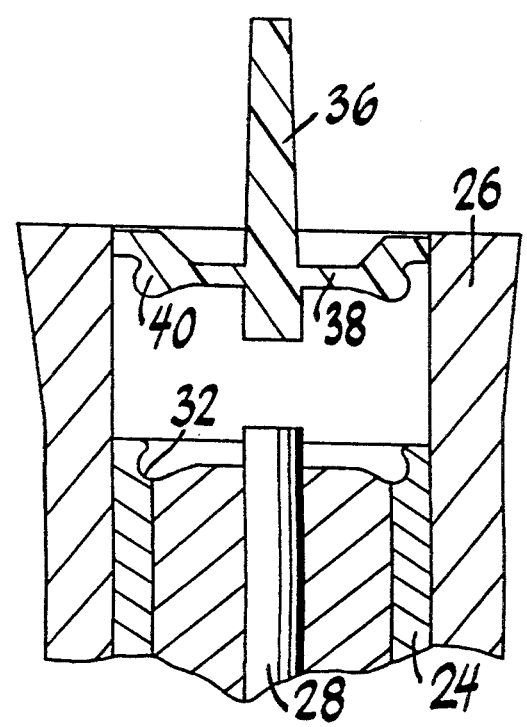
FIG. 3 is a fragmentary sectional view of the apparatus shown in FIG. 1 in a still further stage of the molding operation.
Figure 4:
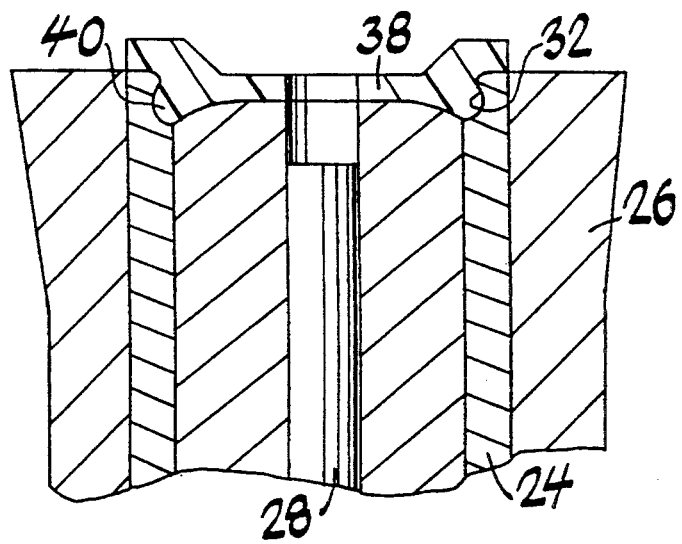
FIG. 4 is a fragmentary sectional view of the apparatus shown in FIG. 1 illustrating the problem solved by our method of removing a stuck sprue.

Owing to the rapidity with which the operations take place and the rapid cooling of the plastic material, it sometimes occurs that in the course of the knockout operation illustrated in FIG. 3, instead of knocking the entire sprue out of the bushing 26, the knockout pin 28 punches a hole in the middle of the central portion 38 of the sprue to leave the condition illustrated in FIG. 4. Upon further cooling of the plastic material, it adheres firmly to the gate cutter 24 and in accordance with the prior art must be melted out of the assembly by use of a torch.

Figure 7:
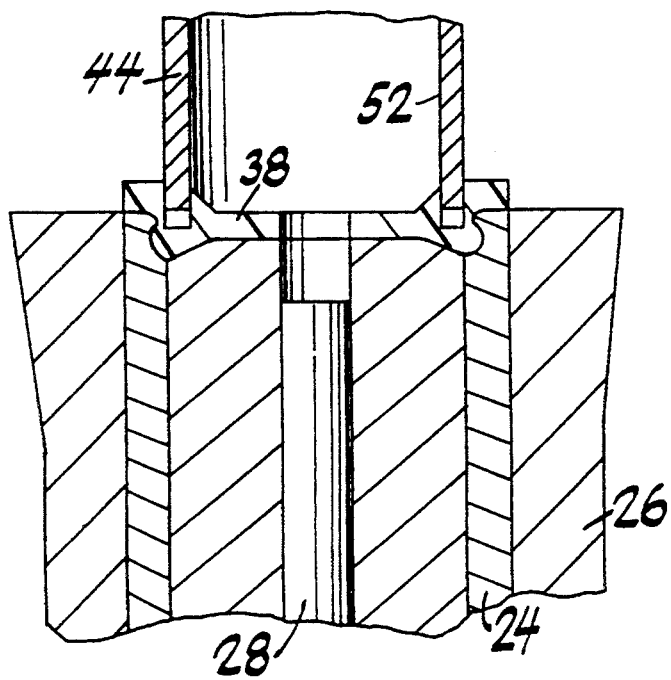
FIG. 7 is a fragmentary sectional view of the apparatus shown in FIG. 4 illustrating the use of our tool in our method of removing a stuck sprue.
Figure 8:
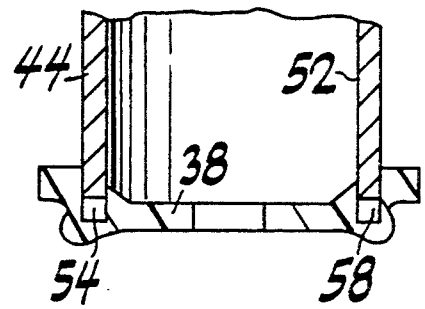
FIG. 8 is a fragmentary sectional view of our tool carrying the sprue following its removal from the molding apparatus.
Figure 5:
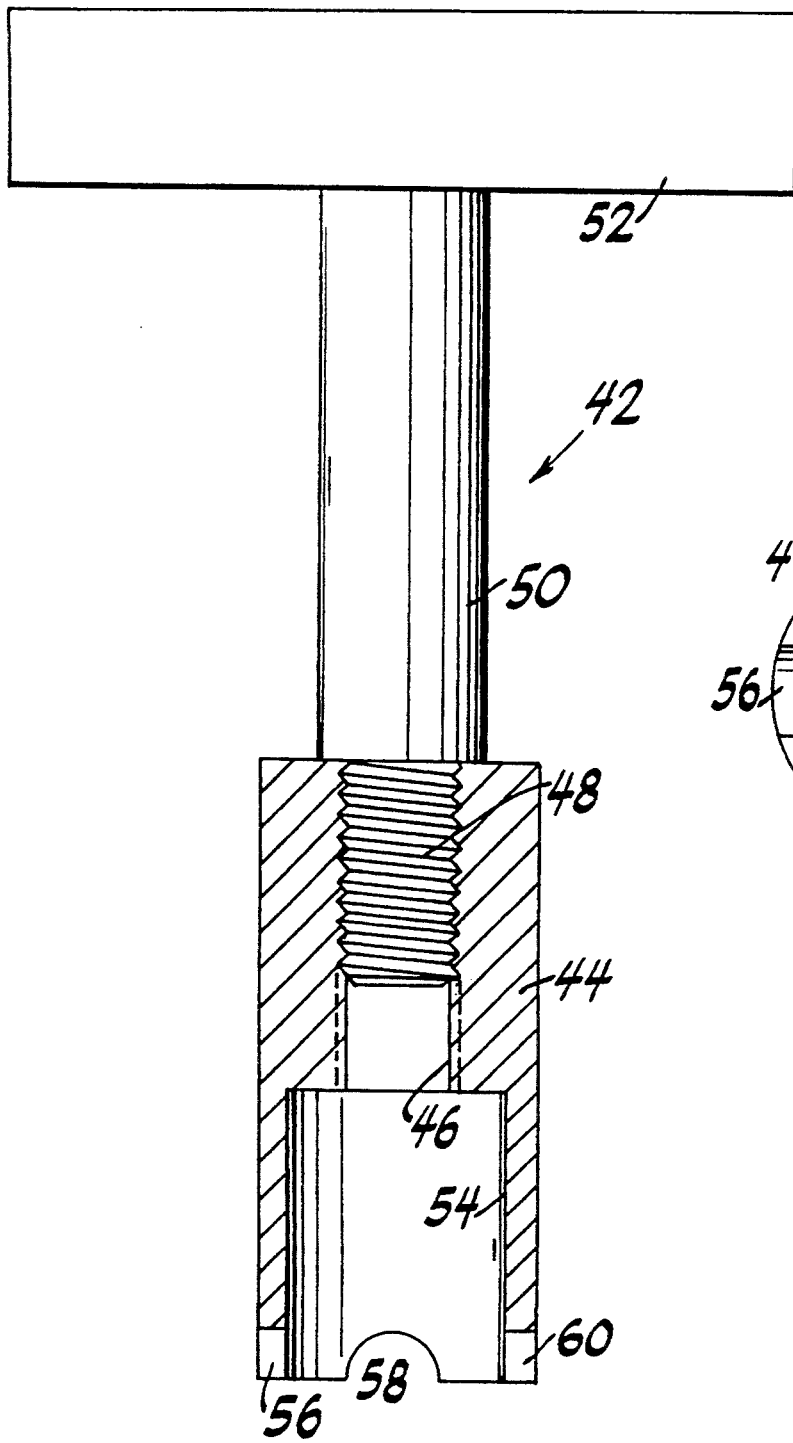
FIG. 5 is a sectional view of our tool for use in our improved method, of removing a stuck sprue.
Figure 6:
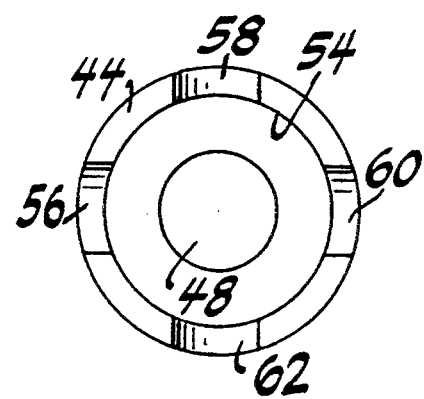
FIG. 6 is a bottom plan of the tool shown in FIG. 5 with a part broken away.

Referring now to FIGS. 6 to 8, our tool, indicated generally by the reference character 42, for use in our method of removing a stuck sprue, includes a body 44 provided with a threaded central bore 46 which may, for example, receive the threaded portion 48 of the shank 50 of a T-handle 52. We form the lower end of the body 44 with a cylindrical recess 54. The lower edge of the tool 42 is formed with a plurality of notches or the like which, in the embodiment illustrated in the drawings, are semi-circular indentations 56, 58, 60 and 62 in the lower end of the tool. It will readily be appreciated that the tool body 44 is formed of some heat conductive material, such for example as steel or the like.

In use of the tool 42 to remove a stuck sprue, the lower end of the tool is first heated by means of a blowtorch or the like to a temperature which is above the melting point of the plastic material. It may, for example, be heated to a red hot condition. After heating, the lower end of the tool is pressed into the sprue at a location adjacent to the boss 40, as illustrated in FIG. 7. At this point, it will be seen that the melted plastic material flows into the indentations or recesses 56, 58, 60 and 62 in the lower end of the tool body 44. Once the lower end of the tool is seated properly, air is blown on the tool to cool it down. It will be appreciated that a source of compressed air to perform this operation is available at the site of the molding machine. Once the tool is cooled, handle 52 is rotated left to right to ensure that the tool is attached to the sprue. When that operation is complete, the tool is rocked back and forth to rock the sprue free of the gate cutter 24 and ejector 22. At this point, the sprue is free of the molding apparatus and attached to the tool as illustrated in FIG. 8.

It will be seen that we have accomplished the objects of our invention. We have provided an improved method of removing a stuck sprue from an injection molding apparatus and a tool for use in practicing the method. Our method and tool facilitate the removal of a stuck sprue in a rapid and expeditious manner. Our tool is simple in construction and inexpensive to manufacture.

It will be understood that certain features and subcombinations are of utility and may be employed without reference to other features and subcombinations. This is contemplated by and is within the scope of our claims without departing from the spirit of our invention. It is, therefore, to be understood that our invention is not to be limited to the specific details shown and described.

Having thus described our invention, what we claim is:

1. A tool for use in removing a stuck sprue from the sprue ejector mechanism of an injection molding machine including a body of thermally conductive material, said body having a hollow lower portion with an open lower end, the edge of said lower end of said hollow lower portion having at least one axially extending indentation therein and a handle attached to said body.

2. A tool as in claim 1 in which said body is metal.

3. A tool as in claim 1 in which said edge of said lower end of said hollow lower portion is formed with a pluraltiy of peripherally spaced axially extending indentations therein.

4. A tool as in claim 1 in which said body is cylindrical.

5. A tool as in claim 4 in which said indentations are arcuate.

* * * * *